United States Patent [19]
Ashton et al.

[11] 3,943,020
[45] Mar. 9, 1976

[54] FILAMENT WOUND BLADE AND METHOD FOR MANUFACTURING SAME

[75] Inventors: Larry J. Ashton, Long Beach; Dale P. Abildskov, San Pedro; Samuel S. Yao, Carson, all of Calif.

[73] Assignee: Fiber Science, Inc., Gardena, Calif.

[22] Filed: Dec. 5, 1974

[21] Appl. No.: 529,744

[52] U.S. Cl. ............ 156/156; 29/156.8 B; 156/172; 156/180; 156/213; 264/137; 416/230
[51] Int. Cl.² .................. B64C 11/26; B65H 54/00
[58] Field of Search ........... 156/198, 166, 169, 294, 156/180, 156, 182, 172, 214, 173, 185, 81, 296, 196, 191, 213; 416/229, 230, 241 A; 29/156.8 B, 156.8 R, 156.8 P; 264/137, 135, 136, 262, 271, 3.3, DIG. 44

[56] References Cited
UNITED STATES PATENTS

| | | | |
|---|---|---|---|
| 2,929,755 | 3/1960 | Porter | 416/230 |
| 3,057,767 | 10/1962 | Kaplan | 416/230 |
| 3,210,228 | 10/1965 | Bluck | 156/173 |
| 3,449,182 | 6/1969 | Wiltshire | 156/172 |
| 3,645,829 | 2/1972 | Palfreyman et al. | 156/169 |
| 3,713,753 | 1/1973 | Brunsch | 416/241 A |
| 3,782,856 | 1/1974 | Solkind | 416/241 A |
| 3,827,118 | 8/1974 | Appel | 29/156.8 B |

*Primary Examiner*—Douglas J. Drummond
*Assistant Examiner*—Michael W. Ball
*Attorney, Agent, or Firm*—Fulwider, Patton, Rieber, Lee & Utecht

[57] ABSTRACT

There is disclosed a method of manufacturing a filament wound blade including the steps of forming a spar by winding a plurality of resin impregnated filaments in side-by-side relationship between a pair of spaced apart spools. The spools are held in their spaced apart orientation to maintain the filaments in their unidirectional orientation and a flexible bondable bag fitted over the spar filaments and inflated to assume a generally cylindrical configuration. Resin impregnated shell filaments are wound in a helical pattern about such bag to form a shell and the bag then deflated and placed in a female mold defining the desired contour of such blade, and such bag then reinflated to thereby cause the shell to assume such desired contour. The mold is then heated to a first temperature to gel the resin impregnated filaments, to a second temperature to cure the spar and shell filaments, and finally to a third higher temperature to melt the bag and bond the spar and shell filaments together to thereby form an integral filament wound blade having unidirectional spar filaments for carrying centrifugal forces and encapsulated in a helical would shell for carrying torsional loads.

9 Claims, 10 Drawing Figures

FILAMENT WOUND BLADE AND METHOD FOR MANUFACTURING SAME

BACKGROUND OF THE INVENTION

1. Field of the Invention

The present invention relates generally to the construction of filament wound blades and more particularly to an economical method of constructing such blades for carrying high centrifugal loads, such as those used in the fan blades of jet engines.

2. Description of the Prior Art

It has been common practice to employ metal fan blades in the fan section of jet engines used in aircraft propulsion. With the popularity of larger and larger jet aircraft, it has been necessary to improve the performance of such jet engines and, in so doing, such engines have become larger and larger, the fan sections thereof now commonly having radii of 20 inches or more. As the radii of such jet fan sections increase, the length of the fan blades must also increase, thus increasing the weight thereof and, consequently, the centrifugal forces experienced thereby during high speed operation. Such heavy blades then require extremely massive hubs to withstand the centrifugal forces applied thereto, thus compounding the difficulties created by the increased jet engine size. Overlying these problems are the requirements for quieter operation imposed by various airport authorities. Efforts have been made to minimize the erosion caused by rain passing through the high speed blades and to improve the impact resistance of such blades to reduce damage resulting from debris passing therethrough during operation. While composite blades have been proposed, the excessively high cost of manufacture thereof has never been effectively attached and since hand layup thereof is economically unfeasible, the problem of a feasible manufacture method has never been solved.

SUMMARY OF THE INVENTION

The method of manufacturing a filament wound blade of the present invention is characterized by the steps of forming a spar by winding a plurality of unidirectional resin impregnated fialments in side-by-side relationship about a pair of spaced apart spools to form a spar belt and holding such filaments in tension while a bondable bag forming a cylindrical tube is fitted over the spar belt and resin impregnated shell windings wound about such bag in helical patterns to form a shell. The uncured and formable spar belt, bag and shell are then fitted into a female mold defining the desired configuration of the blade to press such filaments and bag together to form the desired blade configuration and the mold heated to cure the resin impregnated windings, and then melt the bag and bond such windings together to form a rigid blade structure including a central spar formed by unidirectional filaments encapsulated in a shell formed by helical windings.

The objects and advantages of the present invention will become apparent when taken into consideration with the following detailed description of the drawings.

DESCRIPTION OF THE PREFERRED EMBODIMENT

Figure 1:
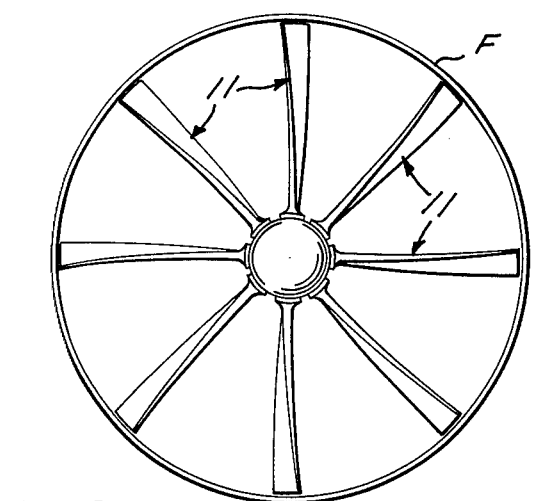
FIG. 1 is a front view of a jet fan incorporating filament wound blades formed by the method of the present invention.
Figure 2:
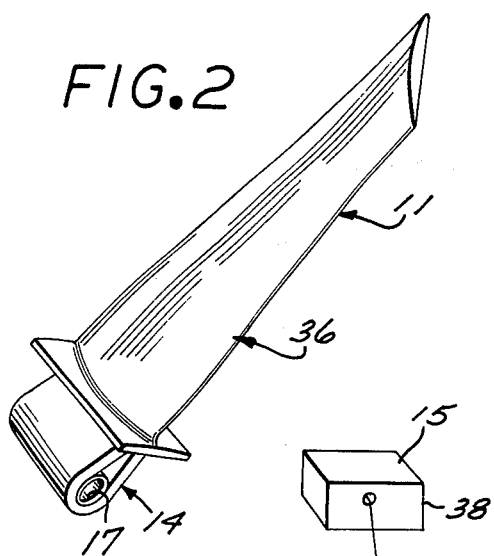
FIG. 2 is a perspective view of a filament wound blade, in enlarged scale, shown in FIG. 1.
Figure 8:
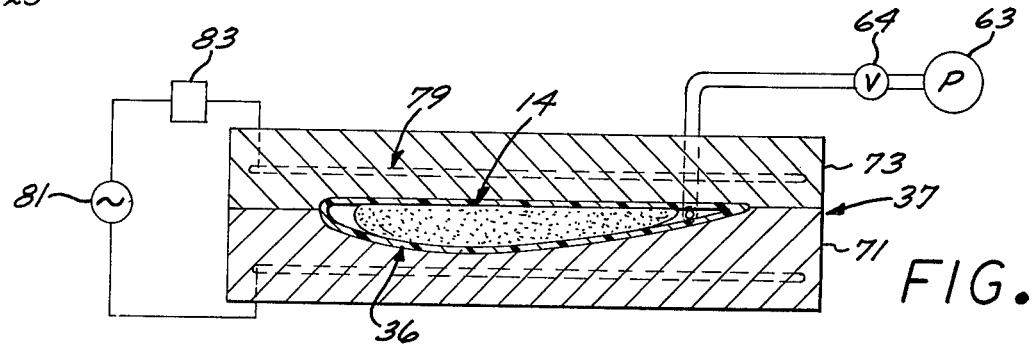
FIG. 8 is a diagrammatic cross sectional view of a female mold defining a cavity forming the desired contour of a blade manufactured by the method of the present invention.
Figure 7:
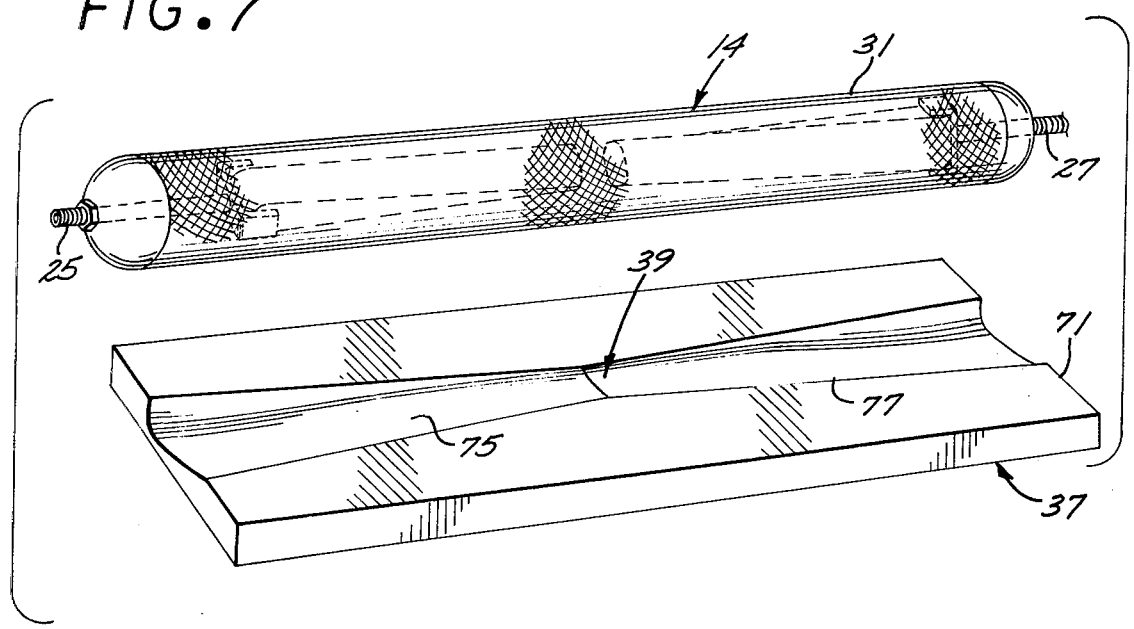
FIG. 7 is a perspective view of the spar and shell windings for the blade shown in FIG. 2 as they are being placed in a mold.

A fan blade, generally designated 11, which may be fabricated by the method of the present invention, is incorporated in a jet fan F and includes a spar belt, generally designated 14, formed by longitudinal unidirectional continuous filaments 13 which may be impregnated with resin 15 as they are wound on spaced apart spools 17 and 19 carried from a rotating yoke 21. After winding of the spar belt 14 is completed, the spools 17 and 19 are removed from the yoke 21 and are mounted in a rotary helical winding fixture incorporating axially aligned rotary spindles 25 and 27. The spar belt 14 is encapsulated in a cylindrical flexible bondable bag 31 which is inflated while continuous shell filaments 35 are wound thereon in helical patterns to form a shell, generally designated 36, over such bag 31. The bag 31 is then deflated, the spar belt 14, bag 31 and shell 36 are then placed in a female mold, generally designated 37 (FIGS. 7 and 8), and the bag 31 again pressurized to cause the shell 36 to take the contour of the mold cavity, generally designated 39. The mold is then heated to cure the resin impregnated filaments 13 and 35, melt the bag 31 and then bond the spar filaments 13 and the shell filaments 35 together. The blade 11 so formed may then be incorporated in a jet fan section F (FIG. 1) with the spar filaments 13 carrying the centrifugal loads applied thereto and the shell filaments 35 carrying the torsional loads applied thereto.

Conveniently, in the preferred embodiment, two fan blades 11 are manufactured simultaneously in end-to-end relationship and the structure then severed in the center to form two separate blades.

Figure 3:
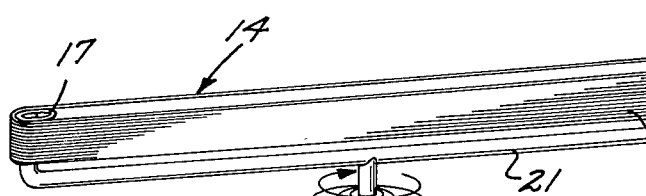
FIG. 3 is a diagrammatic perspective view of a spar winding fixture employed in the method of the present invention.
Figure 5:
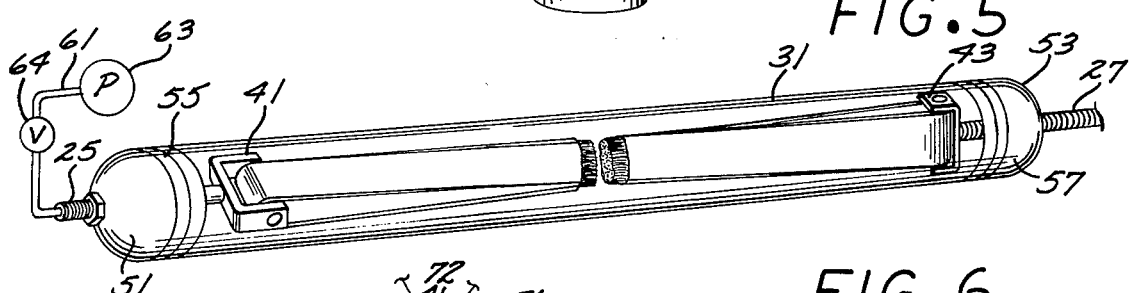
FIG. 5 is a perspective view of a bondable bag fitted over the spar filaments laid down in the steps shown in FIG. 3.

The step of laying the spar filaments 13 down in coextensive relationship is shown diagrammatically in FIG. 3 with the spar filament 13 being drawn from a spool (not shown) and through a bath of resin 15 and fed onto the spools 17 and 19 as they are rotated about the vertical axis of the yoke 21 to form the double length spar belt 14. The filaments 13 may be of any fibrous material having a high tensile strength, such as glass, kevlar 49, graphite or boron. In the preferred embodiment, 3,275 rovings are wound on the spools 17 and 19 to form the spar belt 14, with each such roving constituting 3,000 graphite filaments. Obviously, the number of rovings or windings will vary from application to application. The resin 15 is preferably epoxy, but may be any other acceptable resin, such as phenolic, polyester or polyimide. Such resin is shown in the drawings as being applied from the bath 38 but may, of course, be applied to the spar filaments 13 after they have been wound on the yoke 21. While the preferred embodiment shows the cross section of the spar belt 14 formed in its entirety by filaments 13, it will be appreciated that such cross section could be formed, in part, by a filler or the like.

Since the blade 11 incorporates a variable pitch requiring a twist therein of some 15° or 20°, and the spar windings 13 are of sufficient length to form two blades 11, the spools 17 and 19 must be rotated or clocked approximately 40° with respect to one another when placed in the curing mold 37. In order to accommodate such twisting of the spar windings 13, prior to removal from the yoke 21, a pair of bands 22 and 24 (FIG. 4) are wrapped about the intermediate portion of the spar windings 13 and secured, and the filaments on the opposite sides of the overall spar belt 14 severed at a point between such bands 22 and 24 with only the central-most windings remaining unsevered. This will enable the relatively wide spar belt 14 to accommodate the variation in length for such windings necessitated by the twisting of the belt of windings as described hereinafter.

Figure 4:
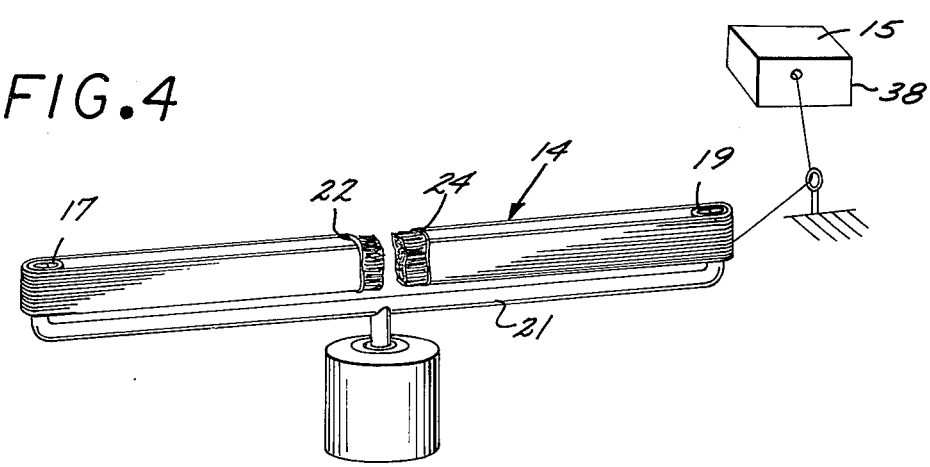
FIG. 4 is a diagrammatic view similar to FIG. 3 but depicting the spar after winding thereof has been completed.

Thereafter, the spools 17 and 19 may be removed by sliding them from the tines of the yoke 21 (FIG. 4) and may then be mounted in a winding fixture incorporating the rotary spindles 25 and 27 (FIG. 4). The spindles 25 and 27 mount respective forks 41 and 43 which are preferably rotated to an orientation approximately 40° out of alignment with one another to cause the spar belt 14 to assume the general orientation of a twisted drive belt to thus approximately simulate the twist throughout the length of the completed variable pitch blades 11.

The bag 31 may be made of any bondable material, such as adhesive film sold by American Cyanamid, under the Trademark FM 1000. It is important that the bag 31 maintains its structural characteristics up to about 250° F., above the curing temperature for the resin 15, but that it melts to form a bond between the filaments 13 and 35 above that temperature, preferably below 350°F.

In the particular configuration shown, the bondable sheet forming the bag 31 is wrapped about a pair of end domes 51 and 53 carried on the respective spindles 25 and 27 and is sealed thereto by means of sealing tape 55 and 57 wrapped about the periphery thereof. Also, the longitudinal seam of the bag 31 is sealed in a similar manner. The spindle 25 is hollow and has a pneumatic line 61 leading thereto from a compressor 63 for inflating such bag 31 as winding of the shell filaments 35 thereon progresses, pressure in such bag being controlled by a control valve 64.

Figure 6:
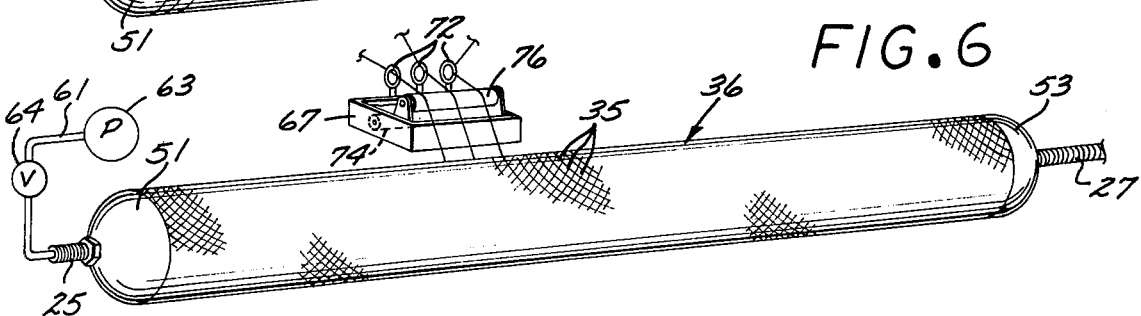
FIG. 6 is a diagrammatic view of shell filaments being wound in a helical pattern on the inflated bag shown in FIG. 5.

Referring to FIG. 6, mounted on the helical winding fixture is a carriage, generally designated 67, including a resin bath 38 having epoxy resin 15 therein for impregnating the filaments 35 as they pass therethrough. The carriage 67 is geared to the spindles 25 and 27 for reciprocation axially along the length of the bondable bag 31 for laying down the shell windings 35 at angles of approximately 45° to the axis of such bag. The carriage 67 includes a plurality of eyelets 72 through which filaments 35 are fed off spools (not shown) to be looped under a submerged roller 74 and passed upwardly over an elevated roller 76 to be fed onto the rotating bag 31. Each layer of windings is composed of two plies of filaments laid down on the bag 31. In the particular construction shown, the shell is formed by two layers of filaments 35 to form a shell wall 0.030 inch thick. As multiple plies of filaments 35 are laid down on the bag 31, the pressure exerted thereby on the bag 31 increases, thus tending to collapse such bag diametrically. However, such tendency to compress such bag 31 is resisted by progressively increasing the pressure therein by periodically opening the valve 64 to admit pressure to such bag.

The mold 37 is a female mold including the bottom half 71 covered by the top half 73, such halves being formed with confronting cavities which cooperate together to form first and second axiallly aligned fan blade cavities 75 and 77 (FIG. 7) for receipt of the opposite halves of the uncured fan blade structure. The mold 37 includes an electrical heater, generally designated 79, connected with a power source 81 and controlled by a control unit 83.

Once winding of the helical windings 35 on the bag 31 has been completed, the spindles 25 and 27 are removed from the helical winding fixture and the entire fan assembly placed in the bottom half 71 of the mold 37 with the bag 31 still slightly pressurized to maintain the helical windings 35 is the desired orientation. The top mold half 73 is then lowered onto the fan structure and the bag 31 partially deflated to enable the blade structure to assume the generally flattened configuration shown in FIG. 8, and the mold halves 71 and 73 then clamped together. The pressurization valve 64 is then opened to pressurize the bag 31 to between 40 and 100 p.s.i. to cause the bondable bag 31 to force the shell 36 outwardly in the fan blade cavities 75 and 77 to closely fit the contour thereof. The heater controller 83 is then switched to approximately 150°F. and held at that temperature for approximately 4 hours to gel the epoxy impregnated spar and shell windings 13 and 35 in position.

The temperature is then elevated to approximately 250°F. and held at that temperature for an additional 2 hours to cure the epoxy resin on such windings 13 and 35. It is important that the bondable bag 31 maintains its structural characteristics during this period of time to thus maintain the shell windings 35 in position closely defining the contour of the mold cavities 75 and 77. After curing the epoxy resin during the 2 hour hold period, the heater controller 83 is again raised to heat the mold 37 to 350°F. and such mold is held at that temperature for an additional hour to melt the bondable bag 31 and bond the spar windings 13 to the shell windings 35. Thereafter, the pressurization valve 64 may be closed and the mold 37 opened to remove the composite fan blades and the blades then separated by cutting the windings 35 centrally and trimming the root and tip ends of the individual blades.

Figure 9:
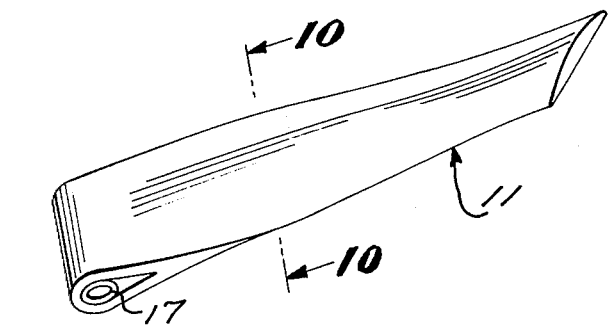
FIG. 9 is a perspective view of the spar and shell windings after they have been removed from the mold.
Figure 10:
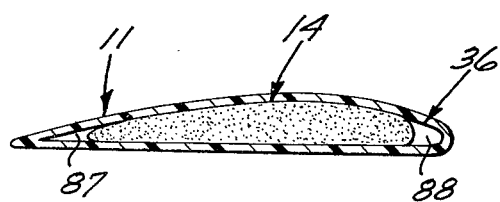
FIG. 10 is a cross sectional view, taken along the line 10—10 of FIG. 9.

Referring to FIGS. 9 and 10, it will be appreciated that the cross sectional area of the formed blade 11 is greater at the root end thereof than at the tip end thereof and that since the spar belt 14 is of constant cross section, the shell 36 will not be entirely filled at the root end, thus leaving leading and trailing edge voids 87 and 88. These voids 87 and 88 are conveniently filled with a filler, such as syntactic foam, formed by tiny glass balloons embedded in an epoxy matrix. The syntactic foam is then heated to 200° F. for curing thereof to fully fill the voids 87 and 88. Obviously, any other equivalent filler, such as syntactic foam made of phenolic or carbon, may be used if desirable. The blade 11 may then be finished by capping the tip end thereof if desirable and laying up a root end flange 95, and the desired number of blades then assembled in a jet fan section F (FIG. 1), with the respective spools 17 and 19 being employed as hub fittings.

With this construction, it will be apparent that not only are the blades 11 relatively light in weight, but the high centrifugal forces experienced thereby at high speeds will be carried in the some 3,000 rovings forming the spar section 14 thereof while the helical shell windings 35 serve to resist torsion loads applied to such blades.

Various modifications and variations of the present invention may be made with regard to the foregoing detailed description without departing from the spirit of the invention.

We claim:

1. A method of manufacturing a filament wound blade including:
    forming a spar belt by winding a plurality of unidirectional filaments in side-by-side relationship between a pair of spaced apart spools;
    holding said spools spaced apart and in the selected orientation with respect to one another to maintain the spar filaments in tension and to cause said spar filaments to collectively assume the general desired configuration of said spar;
    impregnating said filaments with a bonding agent;
    forming a shell by constructing a flexible bondable bag over said spar belt;
    winding side-by-side shell filaments in helical patterns extending about the periphery of said bag;
    impregnating said shell filaments with a bonding agent;
    placing said spar belt and shell in a mold defining the desired contour of said blade to cause said bonding agent on the blade to assume said desired contour;
    curing said spar and shell filaments; and
    heating said bondable bag to a sufficiently high temperature to melt said bag and bond said spar and shell filaments together.

2. The method set forth in claim 1 that includes the step of:
    inflating said bondable bag before winding said shell filaments thereon.

3. The method set forth in claim 1 that includes the step of:
    forming said bondable bag by wrapping the opposite extremities of an adhesive film about a pair of spaced apart circular end domes and sealing said film to said domes.

4. The method set forth in claim 1 that includes the steps of:
    employing epoxy resin as said bonding agents;
    employing a bondable bag which maintains its structural character at 200° F. and melts below 350° F.;
    thereafter, heating said blade to substantially 200° F. for a sufficient time to cure said bonding agents; and
    then heating said blade to substantially 350° F. for a sufficient time to melt said bag and bond said shell filaments to said spar filaments.

5. The method as set forth in claim 1 that includes the step of:
    inflating said bondable bag to at least 40 p.s.i. while in said mold to cause said shell to distend and closely assume the contour of said mold.

6. The method as set forth in claim 1 that includes the steps of:
    forming said bag with a circular cross section; inflating said bag; and
    winding said shell filaments on said bag by rotating said bag while feeding said filaments onto said bag from a carriage travelling axially back and forth with respect to said bag.

7. The method as set forth in claim 1 that includes the steps of:
    supporting said spools from a yoke incorporated in an automatic winding fixture; and
    rotating said yoke to wind said spar filaments on said spool.

8. The method as set forth in claim 1 that includes the steps of:
    supporting said spools spaced apart a distance greater than twice the length of a blade having a predetermined length while winding said spar filaments thereon;
    providing said bondable bag with a length substantially equal to or greater than the spacing between said spools; and
    providing said mold with a cavity defining a pair of fan blades laid end to end and placing said spar belt, bag and shell in said cavity to form a pair of blades.

9. The method as set forth in claim 8 that includes the step of:
    severing a portion of said spar filaments medially before placement in said mold.

* * * * *